No. 730,998. PATENTED JUNE 16, 1903.
W. N. WHITELY.
HARVESTER.
APPLICATION FILED JAN. 16, 1903.
NO MODEL. 3 SHEETS—SHEET 1.
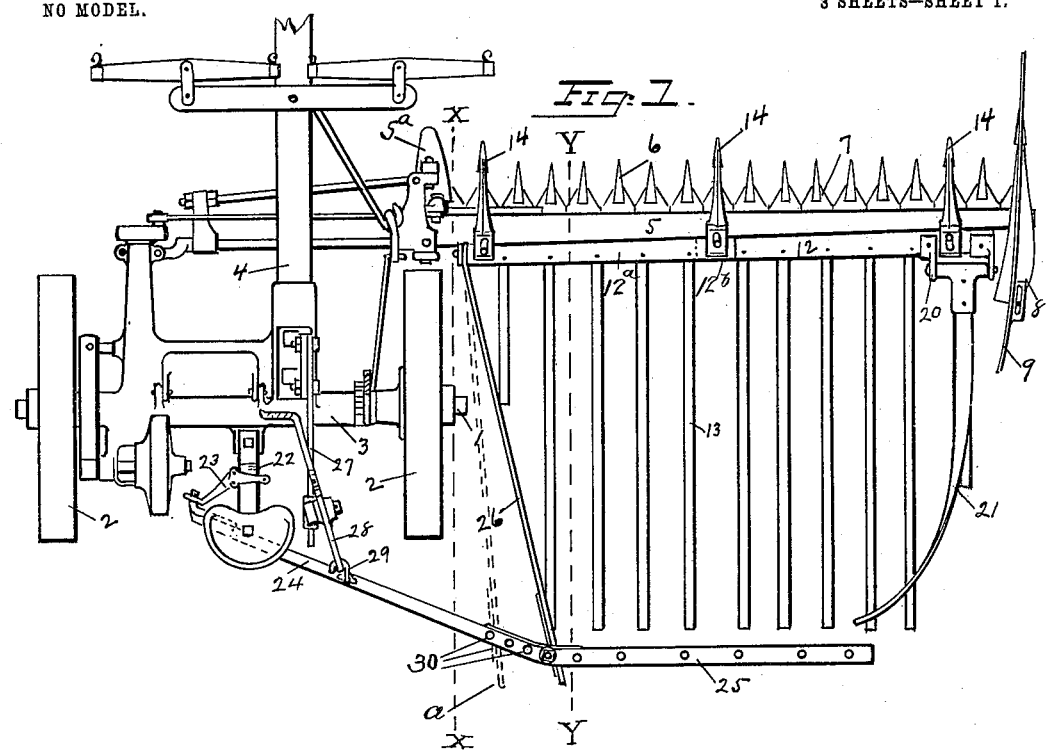
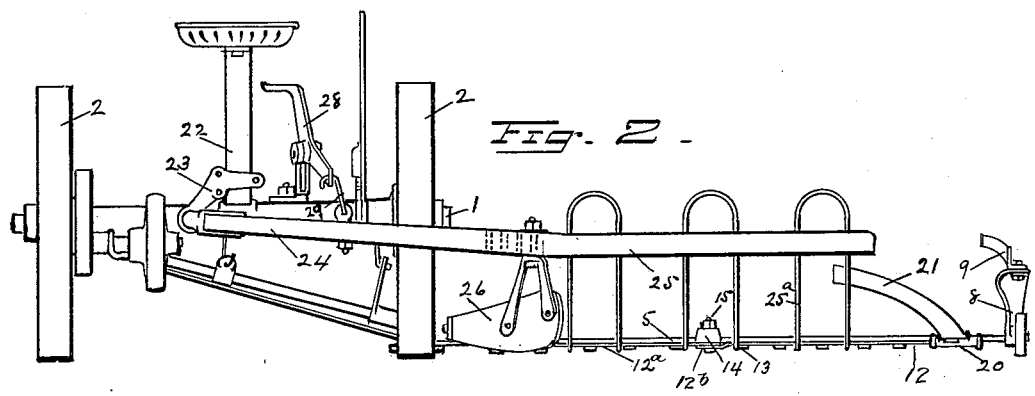
Witnesses
Robert Weiskotten
John L. Gilligan
Inventor
William N. Whitely

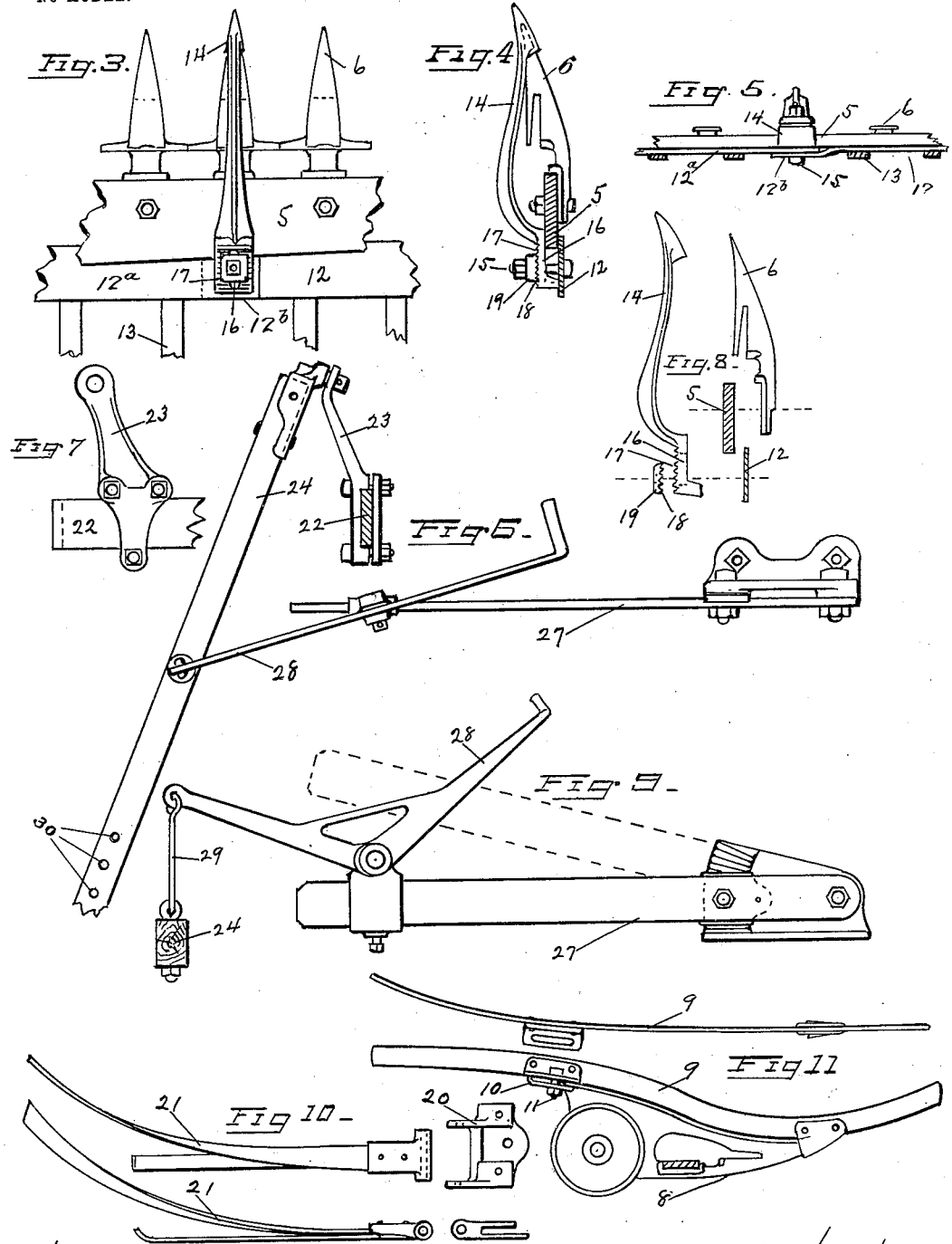

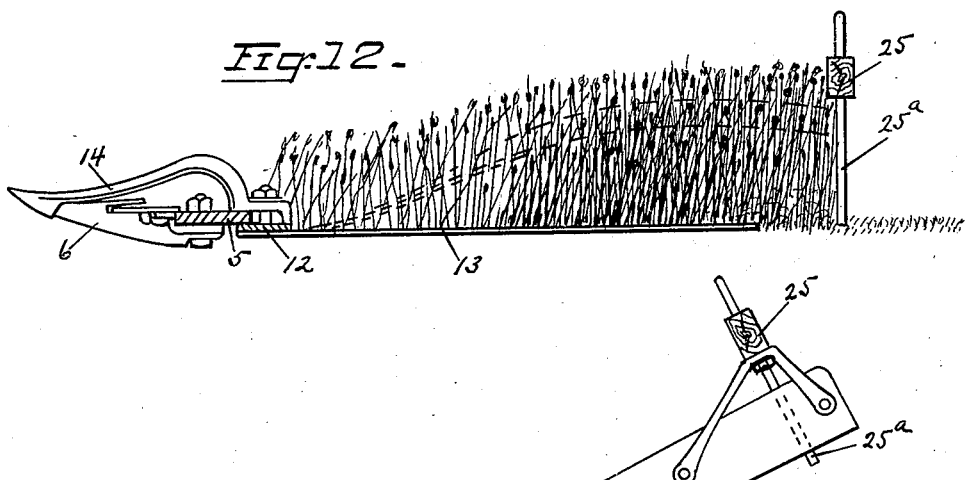
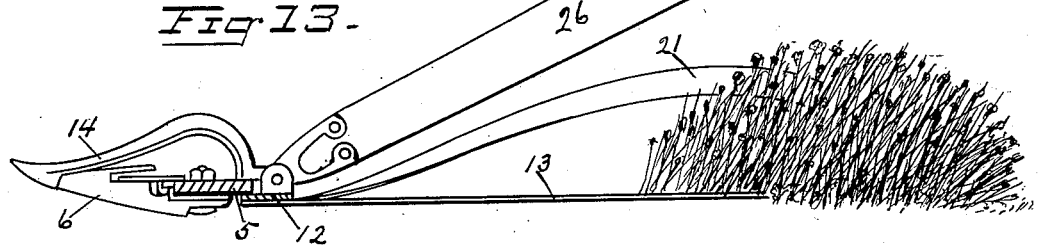

No. 730,998. Patented June 16, 1903.

UNITED STATES PATENT OFFICE.

WILLIAM N. WHITELY, OF SPRINGFIELD, OHIO.

HARVESTER.

SPECIFICATION forming part of Letters Patent No. 730,998, dated June 16, 1903.

Application filed January 16, 1903. Serial No. 139,275. (No model.)

*To all whom it may concern:*

Be it known that I, WILLIAM N. WHITELY, a citizen of the United States, residing at No. 153 East High street, Springfield, in the county of Clark and State of Ohio, have invented certain new and useful Improvements in Harvesters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a crop gathering and discharging attachment to gather and discharge grain and grass crops, and is applicable to mowing-machines and by means of which grain and grass crops when being cut may be collected and deposited in windrows instead of being scattered over the ground as cut, as is the case when using ordinary mowing-machines without my improvements.

I accomplish the objects of my invention by the mechanism illustrated in the accompanying drawings, in which—

Figure 1 is a plan view of a mowing-machine equipped with my invention. Fig. 2 is a rear view of a mowing-machine equipped with my invention, showing the rake in rear of the slatted platform in position for gathering the cut crop, also showing the draw-bar and the connections between the rake, draw-bar, and frame portion of the machine. Fig. 3 is a sectional plan view showing a portion of the finger-bar and the two portions of the transverse bar of the slatted platform connected together at their meeting ends, also the overshoe in position on the guard-finger for connecting and holding the slatted platform to the finger-bar. Fig. 4 is a transverse section of the finger-bar and transverse bar of the gathering and discharging attachment, also showing the overshoe fitting over the point of the guard-finger and the manner of connecting said transverse bar and overshoe to the finger-bar. Fig. 5 is a detail sectional rear view of a portion of the finger-bar and transverse bar, as shown in Fig. 3 showing the two portions of the transverse bar for the slatted platform, the end of one portion of the transverse bar overlapping the end of the other portion and connected together and to the finger-bar by the overshoe and its clamping-bolt. Fig. 6 is a detail sectional plan view of the lifting-lever and rake-arm and the adjustable connection between said lifting-lever and the machine, also the adjustable pivotal arm-support for the stubbleward end of the rake-arm and the manner of clamping said arm to the seat-support. Fig. 7 is a detail rear view of the adjustable pivotal arm-support for the stubbleward end of the rake-arm as shown in Fig. 6. Fig. 8 is a detail view of the parts comprising the construction shown in Fig. 4. Fig. 9 is a detail sectional view of the lifting-lever for operating the rake and the manner of adjusting same on its supporting-arm, also showing the supporting-arm for the lifting-lever and the manner of adjusting same to the machine. Fig. 10 is a detail plan and side view of the swather, showing its pivotal connections to the transverse bar of the slatted platform to allow said swather to rise and fall independently of the platform and finger-bar. Fig. 11 is a detail plan and side view of the divider-shoe at the grassward end of the finger-bar and the manner of adjusting and holding same to the outer shoe of the finger-bar. Fig. 12 is a side view of my crop gathering and discharging attachment, taken on the lines Y Y of Fig. 1, showing the cut crop accumulated on the platform and held thereon by the rake, part of the cut crop resting on the ground in the rear of the slatted platform and against the rake, which is in the rear of the platform. Fig. 13 is a side view of my crop gathering and discharging attachment, taken on the lines X X of Fig. 1, showing the draw-bar and rake raised upward to allow the accumulated cut crop to be discharged from the slatted platform.

In said drawings, 1 represents the main axle of a mowing-machine. 2 2 represent the main driving and supporting wheels, mounted on and supporting said axle. 3 represents the main frame, mounted on said axle between said driving and supporting wheels and on which the driving-gearing and operating parts are mounted. 4 represents the tongue, attached to said frame. Pivotally connected to and supported by said frame 3 is the finger-bar 5, to which is rigidly attached the inner shoe 5ª and guard-fingers 6, through which reciprocates the knife 7. Said main frame, axle, driving and supporting wheels, and finger-bar may be of any desired form and construction, as my gathering and discharging attachment is designed and intended for use with any ordinary mowing-machine. Rigidly connected to the grassward end of said finger-bar 5 is the shoe 8 and to which is connected the divider-shoe 9, which extends over the front part of said shoe 8 and extends forward of said shoe into the uncut crop and inclines upwardly, so as to make a complete separation of the cut from the uncut crop. Said divider-shoe 9 also extends rearwardly of said shoe 8 and is connected and held to said shoe 8 in the manner shown in Fig. 11 by means of the clamp 10 and bolt 11, said divider-shoe 9 being so constructed that it is adjustable and adapted for connection to the different style outer shoes for mowing-machines. The object and purpose of said divider-shoe 9 is to bear the tangled crop down, so that that portion of the crop to be cut is cut loose from that portion of the crop to be left standing, making a complete separation.

In my construction what I term the "cutting" apparatus consists of the finger-bar, the inner and outer shoes attached to said finger-bar, the knife, and guard-fingers.

Rigidly attached to the finger-bar 5 is the transverse bar, which is in two parts 12 and 12ª, the ends of said bars overlapping and connected together at the point 12ᵇ, as shown in Figs. 1, 2, 3, and 5. To said transverse bar is rigidly attached a series of slats 13, extending rearwardly, as shown in Figs. 1 and 3, their free ends trailing on the ground, and while the forward ends of said slats 13 are rigidly connected to the transverse bar 12 and 12ª the slats themselves are elastic, which permits each slat to rise and fall independently of each other, so as to follow the undulations of the ground. Said slats 13 may be made of metal or wood and may be either flat, round, square, or oval in form. Said transverse bar 12 and 12ª, to which said slats 13 are rigidly connected, is located in rear of and rigidly connected to said finger-bar 5, to which it is held by means of the overshoe 14, extending over the point of the guard-finger 6 and rearward and provided with a base to fit upon said finger-bar 5, said overshoe 14 being so formed and constructed as to provide an open space above and rearward of the knife 7, so as to allow all clogging matter to freely escape. The forward edge of said transverse bar 12 and 12ª extends under the rear edge of said finger-bar 5, to which it is rigidly clamped and held, as shown in Figs. 3, 4, and 5, by means of the bolt 15, which passes through said transverse bar 12 and 12ª and through the rearward portion of said overshoe 14, securely clamping said overshoe 14 and transverse bar 12 and 12ª to said finger-bar 5, as shown in Figs. 4 and 5. By referring to Figs. 3, 4, and 8 it will be observed that in the construction of said overshoe 14 I provide a slot 16 in the rear of said overshoe 14, through which said clamping-bolt 15 passes in order that my crop gathering and discharging attachment may be attached to and used with finger-bars of varying width. It will also be observed in the same figures that I provide serrations 17 on the upper rear portion of said overshoe 14 and corresponding serrations 18 on the nut or washer 19 of the bolt 15 to engage with the serrations 17 on said overshoe 14, so as to firmly clamp and hold said transverse bar 12 and 12ª and overshoe 14 to said finger-bar 5 in any position of adjustment.

Rigidly connected to the transverse bar 12 is the supporting-bracket 20, which pivotally supports the swather-arm 21. Said arm 21 extends rearwardly, its rear end inclined stubbleward and twisted laterally, so that the plane of its rear end is not at right angles to the line of draft, (after the principle of the moldboard of a plow,) which causes the cut crop to be gathered as it is cut and directed stubbleward by the pivotal connection of said swather-arm 21 to the bracket 20, as shown in Fig. 10. Said arm 21 is free to rise and fall independently of the slatted platform and finger-bar as the machine moves forward over the ground.

While I show the supporting-bracket 20 for the swather-arm 21 connected to the transverse bar 12, it may be connected to the finger-bar 5 and accomplish the same results as when connected to the transverse bar 12, as shown in the drawings.

Adjustably connected to the seat-support 22 is the supporting-arm 23, which pivotally supports the stubbleward end of the arm 24 for the rake 25. Said arm 23 is constructed in two parts and clamped to said seat-support 22, as shown in Fig. 6, and is held rigidly on said seat-support 22 at any point desired. Said arm 23 forms the pivotal support for the stubbleward end of the rake-arm 24, and while I have shown said rake-arm 24 connected to the seat-support 22 it may be otherwise pivoted to any other part of the machine. Said arm 23 may be adjusted up or down on said seat-support 22 and securely clamped to said seat-support at any point desired. This construction of clamping said arm 23 to the seat-support 22 is more particularly adapted to machines already built where my crop gathering and discharging attachment is to be furnished therefor and where it may be found necessary to vary the position of the arm 23 to accommodate itself to the various kinds of machines in use. To the grassward end of said rake-arm 24 and in the rear of the slats 13 of the platform is connected the rake 25, having a series of teeth 25ª, the teeth of said rake located in rear of the slats 13 of the platform and serving to rake and collect the cut crop and hold it on the platform until it is discharged by the operator.

It will be observed that all of the parts are so constructed and arranged as to fit on any kind of mowing-machines heretofore made. The arrangement for attaching and adjusting the parts as shown and described in the various places is for the purpose of adapting my crop gathering and discharging attachment to machines already in use.

Pivotally connected to the cutting apparatus is the draw-bar 26, which extends rearwardly and grasswardly, forming one side of my crop-gathering device, its rearward end adjustably connected to said rake-arm 24, a series of holes 30 being provided in the grassward end of said rake-arm 24, so that the rear end of said draw-bar 26 may be adjusted grassward or stubbleward when desired, as shown in Figs. 1 and 2, said draw-bar 26 rising and falling with said rake-arm when it is desired to collect and discharge the cut crop. My object in inclining the rearward end of said draw-bar grassward is that it will start the cut crop toward the center of the slatted platform, and by the action of the swather 21, located at the grassward end of the finger-bar 5, the cut crop as collected will be started toward the center of the slatted platform, and by the action of the draw-bar 26 and swather 21 the cut crop will be collected into a more compact bunch and discharged away from the standing crop, so that neither the team nor the machine will interfere with or disturb it when cutting the next swath.

Adjustably connected to the machine-frame is the supporting-arm 27 for the lifting-lever 28, which is adjustably mounted on said arm 27. Said lifting lever 28 may be moved forward or rearward on said arm 27, as desired, for adjustment of said rake-arm 24 and rake 25. Pivotally connected to the rearward end of said lifting-lever 28 is a link 29, which also pivotally connects with said rake-arm 24, and when a sufficient quantity of grain or grass has accumulated on the slatted platform and it is desired to discharge same from said platform said rake 25 and draw-bar 26 are raised by means of said lifting-lever 27, and by the forward motion of the machine the slatted platform is allowed to draw itself out from under the cut crop, which is left discharged upon the ground with the heads up as if shocked, giving the seed the advantage of sun and wind to dry and prepare same quickly for threshing. In my construction I prefer to make a sectional slatted platform constructed in two parts and located in rear of the finger-bar—a divided transverse bar located in rear of the finger-bar and to which the forward ends of the slats of said platform are connected, said slats extending rearward from said finger-bar and trailing on the ground independently of each other, and a rake extending transversely in rear of said slatted platform and wholly independent therefrom—to assist in collecting, holding, and controlling the cut crop. The arm of said rake is pivotally connected to the stubbleward side of the machine, the grassward end of said rake being wholly unsupported. I employ a draw-bar connected to the rake-arm, which extends forward and pivotally connects to the cutting apparatus, forming one side of my gathering and discharging device, and rises with said rake when it is desired to discharge the gathered crop, opening the inner side of my crop-gathering device, as well as the rear end, for the free discharge of the gathered grain or grass, said draw-bar adapted to slide on the ground to hold the teeth of said rake from the ground at any point desired. I also employ a lifting mechanism mounted on the main frame of the machine within easy reach of the operator and connected to the rake-arm and by means of which said rake is raised vertically when it is desired to discharge the gathered crop, and by means of said draw-bar and its connection with said rake-arm the grassward end of said rake moves in the arc of a circle faster and higher than its stubbleward end, so as to free the rake from the cut crop and allow ample space for the gathered crop to pass under it when being discharged from the platform.

In my crop-gathering device part of the cut crop as collected rests on the ground and against the rake as well as part on the slatted platform, as shown in Fig. 12. By this arrangement it facilitates the discharge and makes it quick and certain; but where it is accumulated wholly on the platform it becomes blocked, massed, and congested and does not freely discharge.

My crop-gatherer as a whole is a four-sided construction, as a box with a bottom having two sides and an end, and when the rake and draw-bar are lifted up for the discharge of the accumulated crop the effect is as removing two sides of the box, leaving two sides, with the crop, free and a part resting on the ground, so that the platform draws away from the mass easily. In my construction there are two supports for the rake-arm on the machine-frame at the stubbleward side of the platform, one at the stubbleward end of the arm, and one distant therefrom. By these two supports the rake-arm may be held up, the rake-head overhanging and without any support at its grassward end. It will be observed that in my construction the rake, rake-arm, and draw-bar are free to rise and fall independently of the slatted platform, and the slatted platform is free to rise and fall and adjust itself to the irregularities of the ground independently of the rake, rake-arm, and draw-bar.

The object in constructing the slatted platform in sections is for convenience in packing, that the sections may be laid one on top of the other to make a small compact package for transportation or storing.

In the operation of my crop-gathering device when the operator collects a sufficient quantity of the cut crop on the platform he discharges it, and as he reaches the same point of discharge in each successive round or passage across the field he discharges another accumulation of the cut crop opposite the one previously discharged, thus forming a windrow across the field transverse to the line of draft of the machine.

My invention as applied to harvesting grain and grass crops, more particularly clover for seed, oats, or wheat that is too short to be cut with a binder, can with my attachment be successfully harvested and gathered, whereas if cut with a mowing-machine not equipped with my improvements and allowed to drop on the ground as cut much would be wasted. It is also applicable to harvesting buckwheat, as the seed is very easily threshed out, and in using my attachment it will be handled gently, and, besides, the cut crop when discharged from the slatted platform can be straddled by the machine and team and is left with the heads upward, as if shocked and in good condition for drying.

What I claim as my invention, and desire to secure by Letters Patent, is—

1. In a mowing-machine, in combination, a slatted platform attached to the finger-bar and adapted to slide on the stubble, a rake to collect and hold the crop as the machine moves forward, an arm located between the head of said rake and the rearward part of the machine and pivotally connected to the machine for vertical movement to raise said head, a lifting-lever connected to said arm grassward of its pivotal connection to the machine and extending within reach of the operator to raise said arm and rake-head in a vertical direction to discharge the crop.

2. In a mowing-machine, in combination, a slatted platform attached to the finger-bar and adapted to slide on the stubble, a rake to collect and hold the crop as the machine moves forward, an arm connected with the head of said rake and extending stubbleward and pivotally connected to the rearward part of the machine, a draw-bar, its front end pivotally connected to the cutting apparatus, its rear end connected to the head of said rake or arm stubbleward of the platform to draw said rake forward as the machine moves over the ground, a lifting-lever connected to said arm extending within reach of the operator to raise and lower said arm and head of said rake in a vertical direction on said pivotal connections of said arm and draw-bar.

3. In a mowing-machine, in combination, a slatted platform attached to the finger-bar and adapted to slide on the stubble, a rake located in rear of said platform to collect and hold the crop as the machine moves forward, an arm of said rake extending stubbleward and pivotally connected with the rearward part of the machine, a draw bar, its forward end pivotally connected to the cutting apparatus, its rearward end connected to said rake or arm and acting to hold the cut crop on the stubbleward side of said platform, a lifting-lever connected to said arm and extending within reach of the operator to raise and lower said arm, rake-head and draw-bar.

4. In a mowing-machine, in combination, a slatted platform attached to the finger-bar and adapted to slide on the stubble, a rake to collect and hold the crop as the machine moves forward, an arm of said rake extending stubbleward and pivotally connected to the rearward part of the machine, a draw-bar, its forward end pivotally connected to the inner front corner of the cutting apparatus, its rearward end connected to said rake or arm, means for raising and lowering said arm, rake-head and draw-bar in a vertical direction, said members wholly supported and controlled at the stubbleward side of said platform.

5. In a mowing-machine, in combination, a slatted platform attached to the finger-bar and adapted to slide on the stubble, a rake to collect and hold the crop as the machine moves forward, an arm of said rake extending stubbleward and pivotally connected to the rearward part of the machine, a draw-bar connected to said arm or rake at the stubbleward side of said platform and extending forward and pivotally connected at its forward end to the cutting apparatus, said arm and said draw bar forming a triangle support for said rake, a lifting-lever connected with said rake-arm and extending within reach of the operator and adapted to raise and lower said arm, rake-head and draw-bar in a vertical direction.

6. In a mowing-machine, in combination, a finger-bar, an overshoe fitting over the point of a guard-finger, a slatted platform composed of two sections attached to said finger-bar upon one side thereof near its rearward edge, a clamping screw-threaded bolt located in rear of said finger-bar, said sections meeting and clamped to each other and to said finger-bar and said overshoe by said bolt binding said elements together.

7. In a mowing-machine, in combination, a slatted platform attached to the finger-bar and adapted to slide on the stubble, a rake located rearward of and entirely free from said platform to collect and hold the crop as the machine moves forward, supporting and operating means for said rake located wholly upon the stubbleward side of said platform.

8. In a mowing-machine, in combination, a slatted platform attached to the finger-bar and adapted to slide on the stubble, a rake located rearward of said platform to collect and hold the crop as the machine moves forward, an arm of said rake extending stubbleward of said platform and connected to the rearward part of the machine, a draw-bar connected to said rake or arm at its rearward end and to the stubbleward side of said platform, its forward end pivotally connected to the inner front corner of the cutting apparatus to draw said rake forward in coöperation with said rake-arm's pivotal connection to the machine, said draw-bar forming one side of the crop-gathering devices and adapted to slide upon the ground and to be raised and lowered by said arm or rake-head in a vertical direction to discharge the crop.

9. In a mowing-machine, in combination, a slatted platform attached to the finger-bar and adapted to slide on the stubble, a rake to collect and hold the crop as the machine moves forward, an arm of said rake extending stubbleward and pivotally connected to the rearward part of the machine, lifting means connected with said rake or arm that said arm may turn on its pivotal points of connection with the machine for vertical adjustment, the grassward end of said rake moving in the arc of a circle and faster than its stubbleward end to free said rake from the crop as it is being discharged.

10. In a mowing-machine, in combination, a slatted platform attached to the finger-bar and adapted to slide on the stubble, a rake to collect and hold the crop as the machine moves forward, an arm of said rake extending stubbleward and pivotally connected to the rearward part of the machine, a draw-bar its rearward end connected to said arm or rake, its forward end pivotally connected to the cutting apparatus, said draw-bar located at the stubbleward side of said platform and adapted to slide upon the ground to hold the teeth of said rake above the ground at any point desired, and forming one side of said platform, a lifting-lever connected with said arm within reach of the operator to raise said arm, rake and draw-bar together and open a free passage for the discharge of the collected crop on the stubbleward side of and rearward end of said platform.

11. In a mowing-machine, in combination, a slatted platform comprising a transverse bar to which the slats are attached, said platform attached to the finger-bar and adapted to trail on the ground, a vertically-adjustable rake to collect and hold the crop as the machine moves forward, an overshoe fitting over the point of one of the guard-fingers and extending rearward and provided with a base fitting upon the finger-bar, an open space provided above and in rear of the cutters and said overshoe for the escape of clogging matter, a slot in the rearward part of said overshoe, a screw-threaded bolt passing through said slot to adjust said transverse bar and said platform to the finger-bar and fasten same thereto.

12. In a mowing-machine, in combination, a slatted platform attached to the finger-bar and adapted to slide on the stubble, a transverse bar to which the slats of said platform are attached, a rake to collect and hold the crop as the machine moves forward, a divider-shoe located at the grassward end of said finger-bar to separate the cut from the uncut crop, a swather pivotally connected to said transverse bar and located at the grassward end of said platform, to turn the crop stubbleward as cut, the rear end of said swather adapted to rise and fall independently of said platform or finger-bar as the machine moves forward.

13. In a mowing-machine, in combination, a slatted platform attached to the finger-bar and adapted to slide on the stubble, a rake located in rear of said platform to collect and hold the crop as the machine moves forward, an arm of said rake extending stubbleward and to which said rake is connected, a pivotal support on the machine for the stubbleward end of said arm, said support adapted for fixed adjustment vertically, a lifting-lever supported on the machine and pivotally connected to said arm to raise and lower said arm and rake in a vertical direction on said pivot.

14. In a mowing-machine, in combination, a slatted platform attached to the finger-bar and adapted to slide on the stubble, a rake to collect and hold the crop as the machine moves forward, an arm of said rake extending stubbleward, an adjustable arm on the seat-support to which the arm of said rake is pivotally connected, a lifting-lever connected to the arm of said rake grassward of its pivotal connection to the machine and extending within reach of the operator to raise and lower said arm and rake in a vertical direction for the purpose of gathering and discharging the cut crop.

In testimony whereof I affix my signature in presence of two witnesses.

WILLIAM N. WHITELY.

Witnesses:
JOHN L. GILLIGAN,
ROBERT WEISKOTTEN.